US006854746B2

(12) United States Patent
Stolfus, II

(10) Patent No.: US 6,854,746 B2
(45) Date of Patent: Feb. 15, 2005

(54) SPRINT CAR STARTER SYSTEM

(76) Inventor: Kenneth R. Stolfus, II, 3890 Doc Henry Rd., Lee's Summit, MO (US) 64082

( * ) Notice: Subject to any disclaimer, the term of this patent is extended or adjusted under 35 U.S.C. 154(b) by 69 days.

(21) Appl. No.: 10/229,733

(22) Filed: Aug. 28, 2002

(65) Prior Publication Data

US 2003/0042062 A1 Mar. 6, 2003

Related U.S. Application Data

(60) Provisional application No. 60/315,760, filed on Aug. 29, 2001.

(51) Int. Cl.[7] .................................................. B60K 8/00
(52) U.S. Cl. ...................................................... 280/54.1
(58) Field of Search .............................. 74/7 B, 6, 7 R; 180/54.1, 58, 60, 291, 292, 297, 294, 298, 299

(56) References Cited

U.S. PATENT DOCUMENTS 2,014,258 A * 9/1935 Lansing ................. 123/179.22
2,122,038 A * 6/1938 Liverance, Jr. ........... 290/38 R
2,591,445 A * 4/1952 Lehman ....................... 74/7 R
2,753,719 A * 7/1956 Jacobs et al. ..................... 74/6
4,274,292 A * 6/1981 Arnett, Jr. ......................... 74/6
4,666,122 A 5/1987 Goodard
5,683,320 A 11/1997 Friesen et al.
6,170,596 B1 * 1/2001 Triarsi et al. ............... 180/291
6,204,577 B1 3/2001 Chottiner et al.
6,213,829 B1 4/2001 Takahashi et al.
2004/0129481 A1 * 7/2004 Stolfus ....................... 180/291

OTHER PUBLICATIONS

Chuck Fry, "Anatomy of a Sprint Car", http://www.best-.com/~chucko/racing/the–cars.html.

* cited by examiner

*Primary Examiner*—Bryan Fischmann
(74) *Attorney, Agent, or Firm*—Erickson & Kleypas, L.L.C.

(57) ABSTRACT

A starter system for racing vehicles such as sprint cars that enables the vehicle to be started while in position for a race without the need for a clutch or external means of generating forward motion.

17 Claims, 6 Drawing Sheets

SPRINT CAR STARTER SYSTEM

CROSS REFERENCE TO RELATED APPLICATION

This application claims the benefit of the prior filed, co-pending provisional application Ser. No. 60/315,760, filed Aug. 29, 2001.

FIELD OF THE INVENTION

This invention relates to an electrical starter system for a vehicle and more particularly to a cockpit-mounted starter system for a sprint car.

BACKGROUND OF THE INVENTION

A sprint car is a relatively small, open-wheel racing vehicle. The chassis is a lightweight tubular frame with a relatively short wheelbase. The sprint car has two small wheels in front and two large wheels in back. The back wheels are run with low pressure during a race, approximately 15 pounds, and are usually staggered in size to help hold the car on the banked track. Racing rules govern the size of the sprint car, the types of materials used to compose the vehicle, whether or not airfoils are allowed, and the size and power of the engine.

Because most sprint cars are composed of the same materials, constructed in a similar way and powered by similar engines, a significant factor to vehicle performance during a race is the overall weight of the vehicle. Sprint cars are, therefore, constructed so as to minimize weight. This includes using lightweight materials such as aluminum to construct the frame and other elements. In addition, sprint cars traditionally do not have a battery or starter. To start the engine, a sprint car must be pushed by a push truck or other vehicle to a relatively high rate of speed. While the sprint car is being pushed, the driver monitors the oil pressure, and when an optimum pressure is achieved, a switch is thrown allowing electric current to flow from a magneto to the engine spark plugs, thereby enabling combustion to initiate.

Another key factor determining performance is weight distribution. Sprint cars drivers have found it advantageous to distribute the weight of the vehicle towards the rear, thereby increasing traction, especially on a banked curve. Sprint car drivers who have incorporated starters in their sprint car design have faced the problem, not only of increased overall weight, but of increased forward weight in the engine compartment.

The present invention overcomes the above problems in the prior art by providing a new starter system so that a sprint car may be started without the use of a push truck. A flywheel of reduced size is provided to minimize weight increase and rotary inertia, and the starter is located rearward of the engine, preferably in the driver's compartment, thereby shifting weight distribution towards the rear of the vehicle.

SUMMARY OF THE INVENTION

It is, therefore, an object of the present invention to provide a starter system for a sprint car thereby eliminating the need for push trucks or other external means of starting the engine, whereby the overall operation of sprint car racing is rendered more efficient and more suitable for televising.

Another object of the present invention is to provide a starter system for a sprint car which renders the operation of sprint car races safer for the drivers and track personnel by eliminating the need for push trucks on the track during a race.

Another object is to provide a starter system for a sprint car that may be easily installed with minimal adjustments or changes required to a common sprint car configuration.

Another object is to provide a starter system for a sprint car whereby the weight is distributed rearward of the engine compartment.

Still another object of the present invention is to provide a starter system for a sprint car wherein the flywheel is of reduced size, thereby minimizing weight, rotary inertia, and the space required to house the fly wheel.

Yet another object is to provide a compartment for housing the flywheel and starter pinion assembly whereby said assembly is protected from dirt, dust, debris and moisture while in operation.

In furtherance of the foregoing, the starter system includes a starter positioned in the driver's compartment, a battery connected to the starter for providing electric power to the starter motor, a flywheel positioned rearward of the engine compartment and forward of the cockpit, a crank shaft connecting the engine and the flywheel, and a drive shaft connecting the flywheel to the rear wheels of the vehicle, the starter having a pinion gear engageable with the flywheel for rotating the flywheel and starting the engine. The flywheel is of a reduced size to minimize the vehicle weight and to facilitate placement of the flywheel in a space provided between the engine block and cockpit.

DETAILED DESCRIPTION

Figure 1:
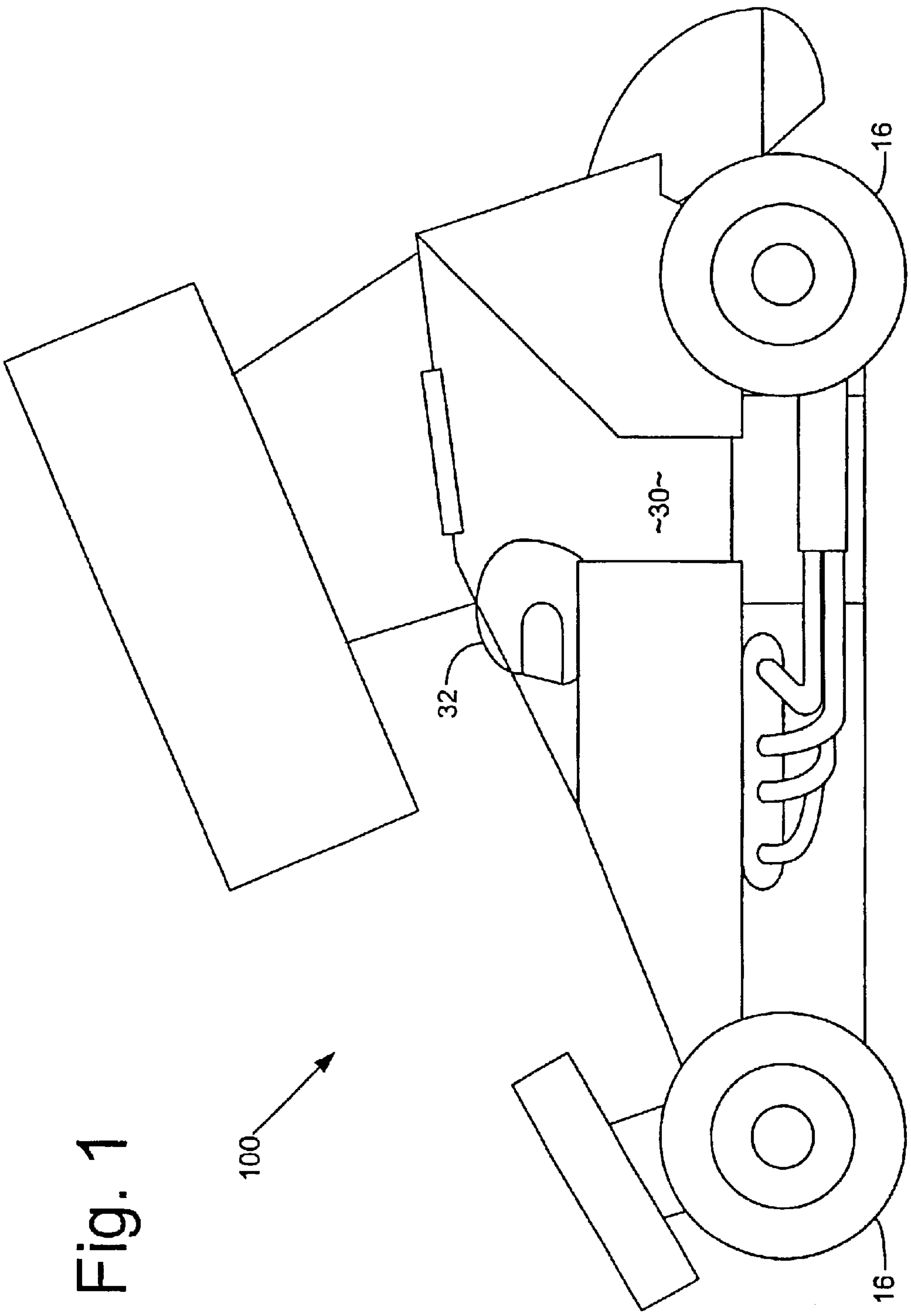
FIG. 1 is a diagrammatic side elevational view of a sprint car.

Referring to FIGS. 1–6, a starter 40 is mounted in the driver's compartment (cockpit) 30 of a sprint car 100, and a flywheel 4 is mounted on the engine crankshaft 19 such that the pinion 15 of the starter 40 engages the flywheel 4 thereby enabling the driver 32 to start the engine 9 by activating a switch (not shown) in the cockpit 30. The starter 40 typically comprises a motor 41, solenoid 42, gear reduction assembly 43, and pinion 15.

Because of the novel positioning of the starter 40 within the cockpit 30 of the sprint car 100, the starter 40 typically must be converted to left-hand rotation. This conversion may be accomplished by rewinding the starter armature using methods and materials commonly known to one skilled in the art. To develop the necessary torque to adequately turn the engine 9, the starter motor 41 may include a gear reduction assembly 43 to increase the output torque. Production starter motors are available that afford various gear reductions, pinion choices and power ratings. These starters can be selected in conjunction with the flywheel starter gear and pinion to develop the most advantageous torque for the specific engine to which the starter system is applied.

The diameter of the crankshaft-mounted flywheel 4 should be within a range conducive to locating the flywheel 4 and starter pinion 15 within an area rearward of the engine 9. For the sprint car starter system of the present invention, a flywheel diameter of 4½ to 10½ inches is preferable. The perimeter of the flywheel 4 is provided with gear teeth indexed to mesh with the teeth on the starter pinion 15. In the preferred embodiment the flywheel 4 has a 10 diametral pitch and approximately an 8½ inch outer diameter. The flywheel 4 is typically attached to the crankshaft 19 by means of a crankshaft flange 56 typically provided with an engine 9.

Figure 5:
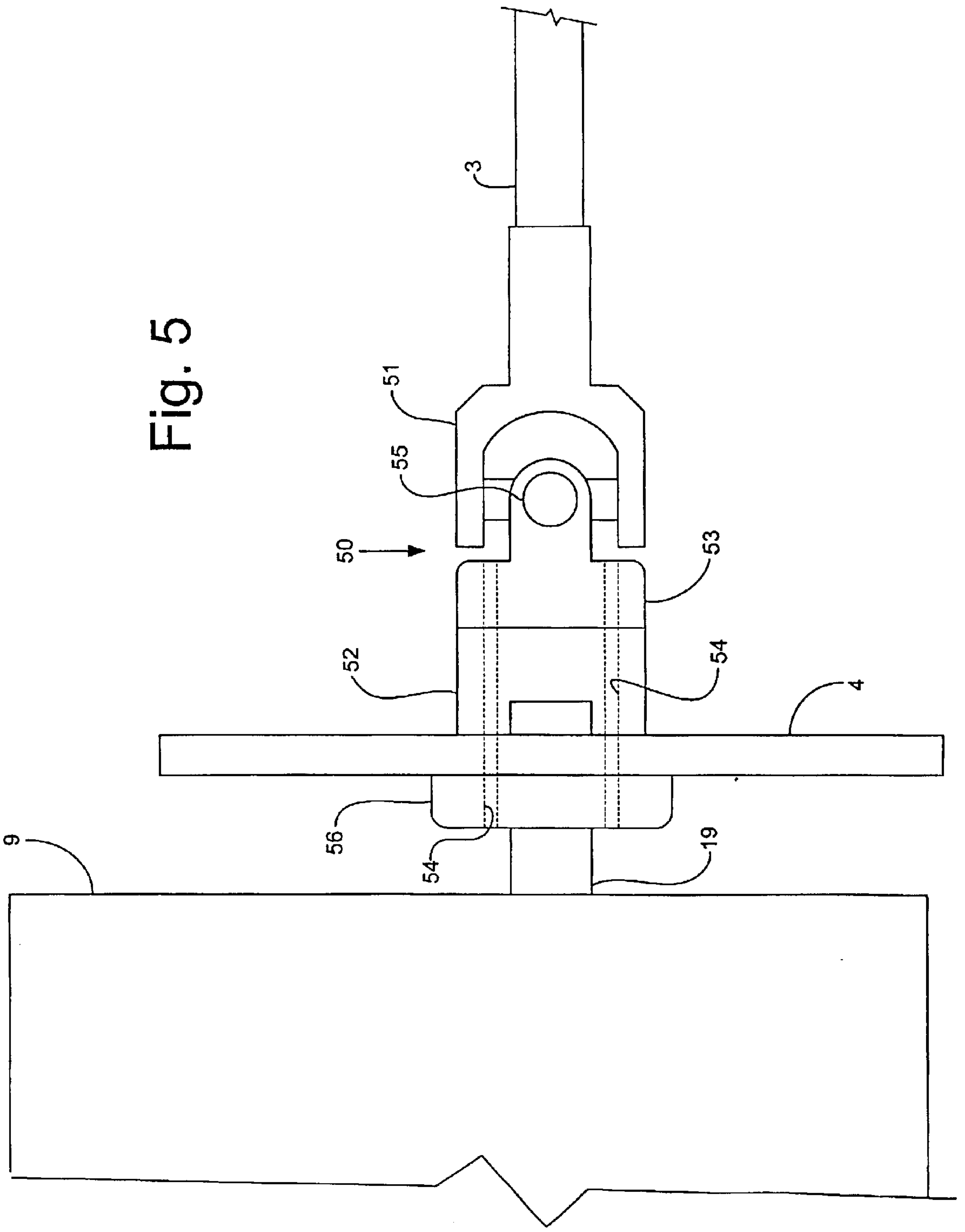
FIG. 5 is an enlarged, partial, side elevation showing a portion of the drive-train assembly comprising the engine, crankshaft, flywheel, spacer, yoke assembly, and driveshaft.

As shown in FIG. 5, a spacer 52 is attached to the rearward side of the flywheel 4 to move the mounting point of a U-joint flange 53 rearward. The spacer 50 may incorporate gear teeth (not shown) to engage timing belts or gears to power pumps or other devices, (e.g., power steering, fuel and oil pumps). The U-joint flange 53 for the U-joint/yoke assembly 50 (see elements numbered 51, 53, and 55) is then attached with through-bolts that fasten the flywheel 4, spacer 52, and yoke assembly 50 to the back of the crankshaft 19. Dashed lines in FIG. 5 indicate the approximate position of holes 54 that contain the through-bolts after assembly.

The rear motor mount plate 1 is attached to the chassis 10 at the front cockpit frame rails 25 and 26. The horizontal front cockpit frame rails are shown in cross-section in FIGS. 2 and 3 and designated by the numbers 25 and 26. The vertical frame rails are not shown but connect the ends of rails 25 and 26 to form a rectangular frame. The starter mount plate 5 is placed inside the cockpit 30 on the rearward side of the front cockpit frame rails 25 and 26. The cockpit frame rails, rear motor mount plate 1, and starter mount plate 5 define a flywheel compartment located between the engine 9 and the cockpit 30, in which the flywheel 4 and starter pinion 15 are contained. Spacers 21, 22, and 23 (indicated by dashed lines in FIG. 4) may be placed between the rear motor mount plate 1 and the starter mount plate 5 to stabilize the plates.

The engine 9 is placed into the chassis 10, positioning the flywheel 4 through and behind the rear motor plate 1. The torque tube housing 12, which is machined so as to position the torque ball 14 at the yoke assembly pivot point 55, is attached on the cockpit side of the starter mount plate 5. The torque ball 14 and retaining ring 13 are placed over the torque tube 8. The driveshaft 3 is then splined and inserted into the U-joint yoke 51. Through-bolts 24 fasten the starter mount plate 5, the chassis frame rails 10, mounting plate spacers 21, 22 and 23, if included, and the rear motor mount plate 1 to the engine block 9. A front motor mounting plate (not shown) is then bolted to the chassis 10 and the engine 9 using through-bolts at the front of the engine 9. Front mounting plate spacers (not shown) may be included in this front motor mount assembly, if necessary. The torque ball 14 is then secured within the torque tube housing 12 using the torque tube retaining ring 13.

A starter solenoid 42 is mounted in proximity to the starter motor 41 and is operated by a known type of starter control circuit. The solenoid 42 is connected to a pinion 15 for sliding the pinion 15 a predetermined distance to engage the pinion gear with the flywheel 4. The starter motor 41 and solenoid 42 are mounted on the cockpit side of the starter mount plate 5, to the right and upwards of the torque tube housing 12. A starter mounting block 2 is fastened to the starter mount plate 5 within the cockpit 30. The starter mounting block 2 may incorporate adjustment screws, or jack bolts and shims, to adjust the pinion-to-flywheel radial depth and the pinion engagement depth.

Figure 2:
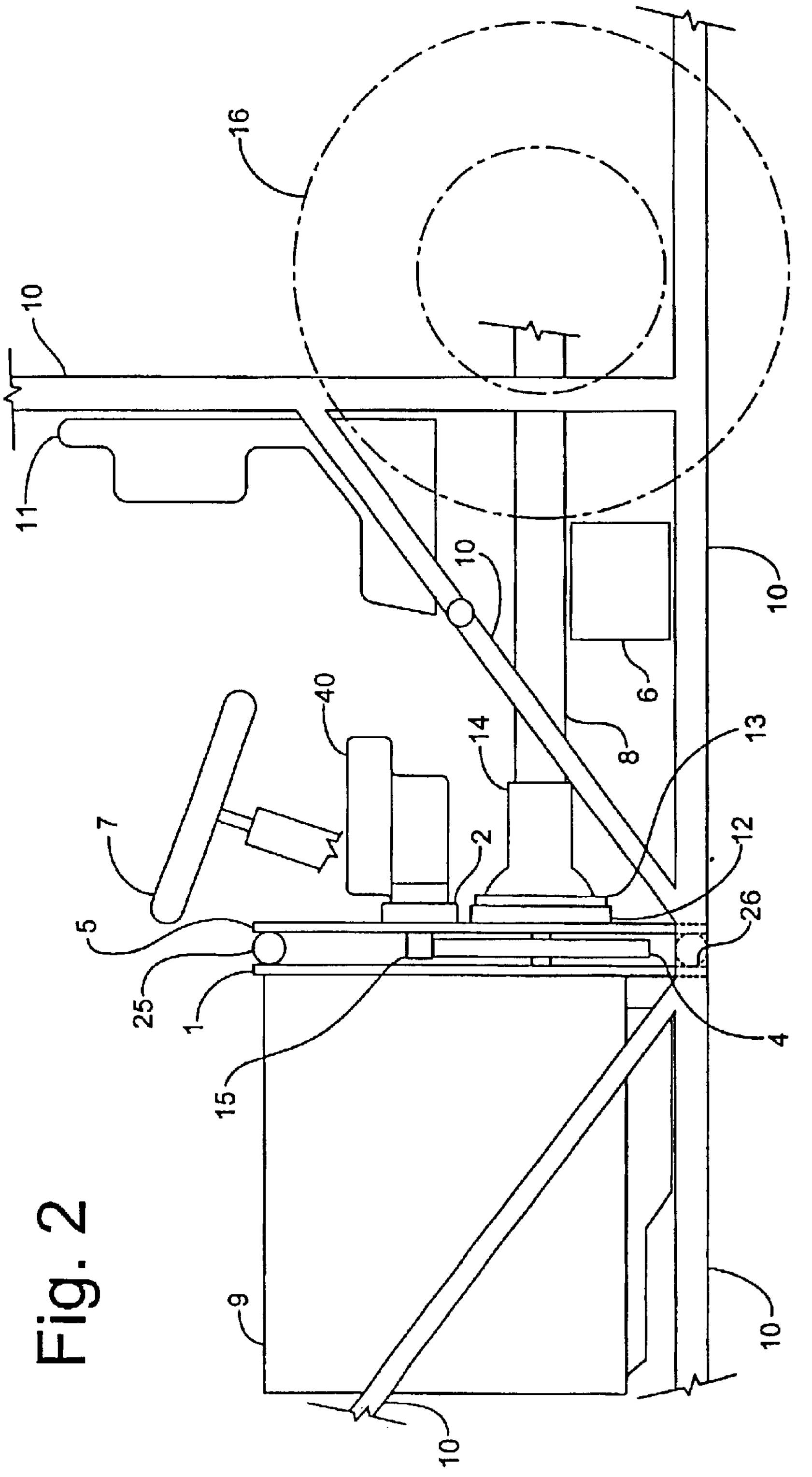
FIG. 2 is an enlarged, partial, side view, cut away to reveal details of the starter mounted below the steering column and upwardly adjacent to the drive shaft.
Figure 3:
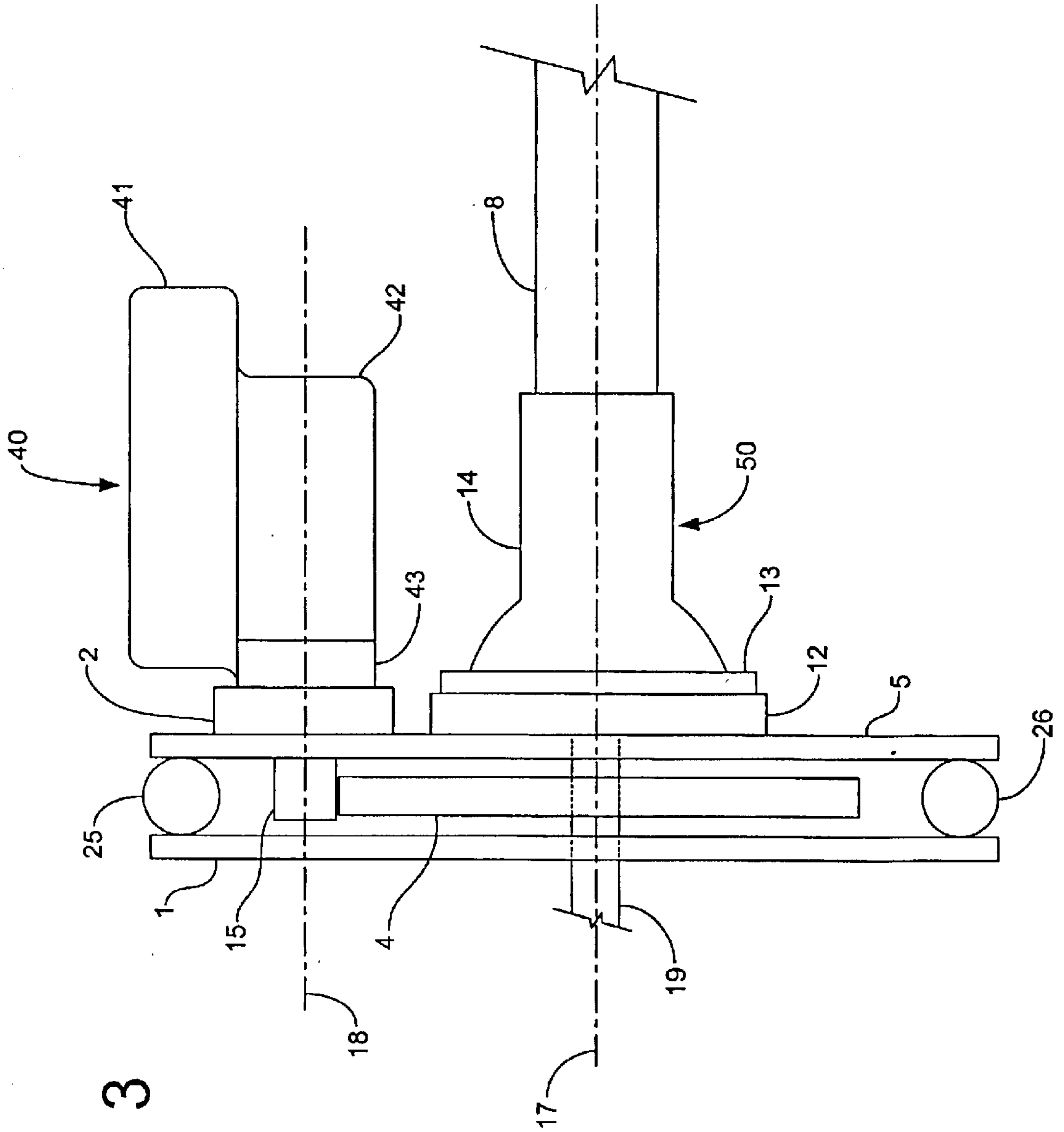
FIG. 3 is an enlarged and simplified, partial, side elevation of the starter mounted to the rear engine wall, showing the crankshaft passing through an aperture in the rear engine mounting plate toward the cockpit, the flywheel attached to the crankshaft and located within the flywheel compartment, and the starter mounted to the starter mount plate.
Figure 4:
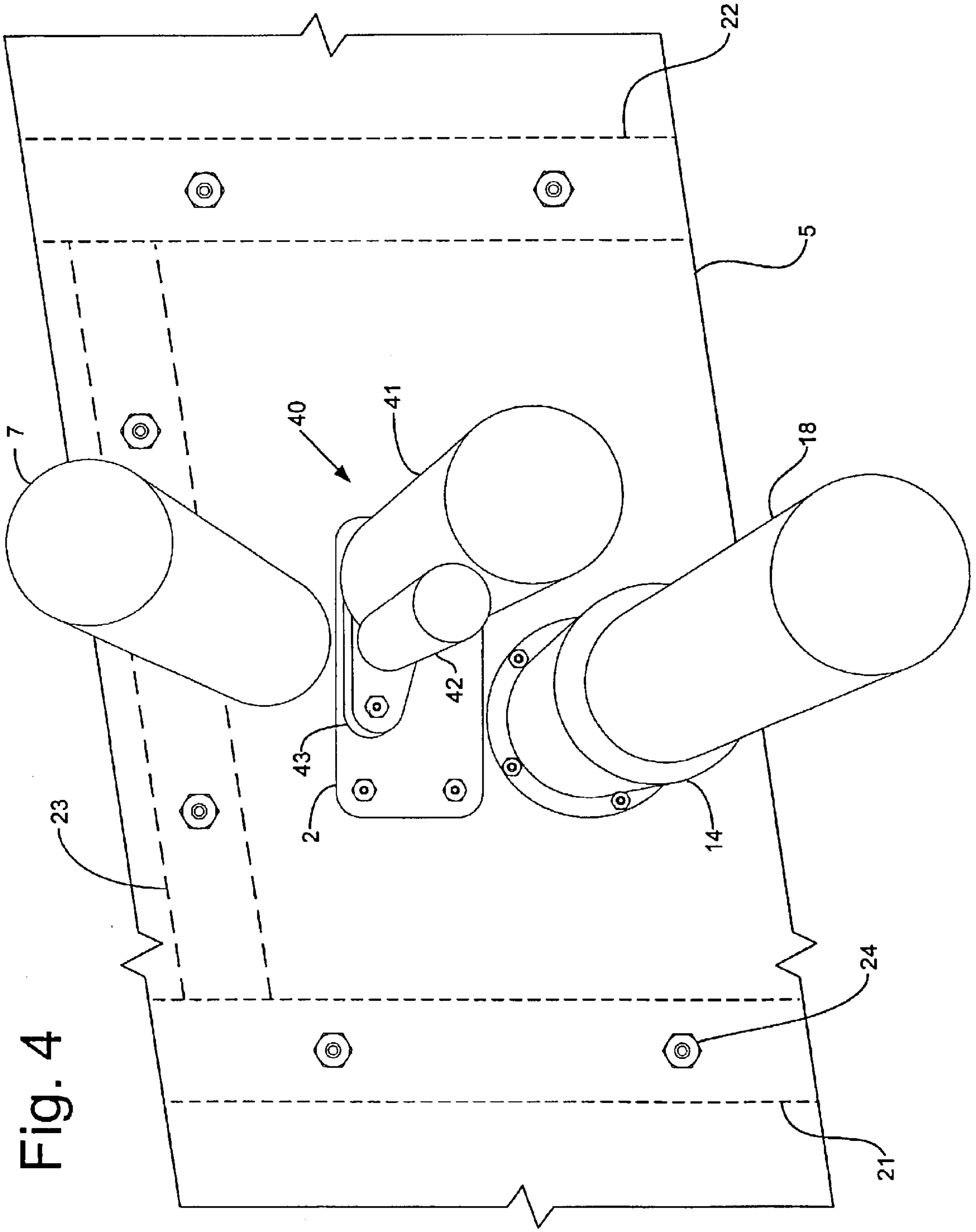
FIG. 4 is an enlarged perspective view of the chassis, engine, flywheel, starter assembly, and cockpit of a sprint car showing the sprint car starter system in place in relation to the body of a sprint car.

The starter 40 may be mounted at a location usually occupied by a vehicle fuel pump (not shown). In one embodiment, the fuel pump is moved to a location forward of the rear motor mount plate 1, thereby reducing driver 32 exposure to fuel under pressure. FIG. 2 is an enlarged, partial, side view, cut away to reveal details of the starter 40 mounted below the steering column 7 (see also FIG. 4). A sprint car wheel 16 is shown in phantom lines.

Figure 6:
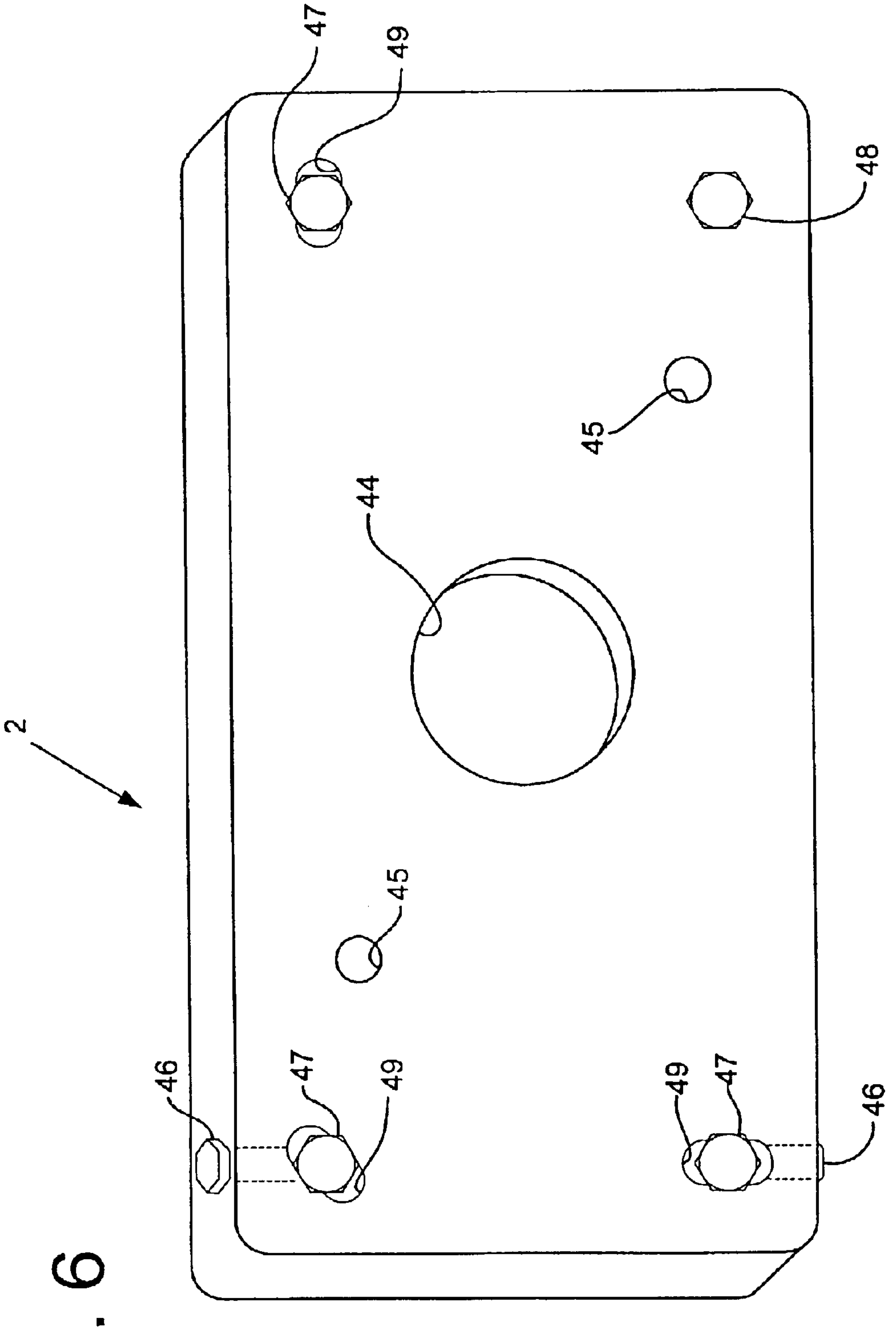
FIG. 6 is a detailed perspective view of the starter mounting block showing a means for adjusting the engagement of the starter pinion to the flywheel.

In FIG. 6, an example of an operable mounting block is designated as 2. The starter mounting block has a large central hole 44 to receive the starter pinion 15. Starter mounting holes 45 are provided so that the starter 40 may be bolted onto the starter mounting block 2. The starter mounting block 2 is fastened to the starter mount plate 5 using three bolts 47 fitted into slots 49, and a fourth pivot bolt 48 fitted into a circular hole (not shown). When adjustment screws 46 are rotated, they alter the position of the bolts 47 within the slots 49 by moving the mounting block 2 around a pivot point formed by the fourth pivot bolt 48. Moving the mounting plate in this manner adjusts the position of the pinion 15 relative to the flywheel 4.

The starter 40 is then connected, using appropriate wiring, to a battery 6 located underneath the driver's seat 11. A switch (not shown) is provided with the starter wiring assembly and is mounted within the cockpit 30. This cockpit mounting location places the starter 40 and associated electrical components in a location where they are less exposed to dirt, dust and moisture from the track, and where they can be easily serviced.

When the starter 40 is in operation the solenoid 42 is activated, thereby extending the pinion 15 such that it engages the flywheel 4. The flywheel 4 incorporates a ring rear on its outer periphery. The pinion 15 of the starter 40 is engaged with the ring gear of the flywheel 4 for driver-initiated electric starting of the engine 9. The engagement of the pinion 15 to the flywheel 4 may be adjusted using adjustment screws on the starter mounting block 2.

The starter motor 41 turns the pinion 15, which rotates about an axis 18 turning the flywheel 4. The flywheel 4 turns the crankshaft 19 (and driveshaft 3 if engaged), which rotates about axis 17. The crankshaft 19 moves the associated engine components causing the engine to start in a manner known to one skilled in the art. When the electrical supply to the starter motor 41 is stopped, the solenoid 42 is no longer activated and the pinion 15 recedes into its housing, thereby disengaging the pinion 15 from the flywheel 4 during normal engine operation.

It should be appreciated that the starter system of the present invention provides a means for starting a sprint car 100 without the need for a push truck or other external source of power, while distributing the weight of the starter system rearward of a conventional starter assembly. By locating the starter 40 within the cockpit 30, not only is weight shifted rearward, but the starter system is less exposed to the elements. The location of the starter 40 within the cockpit 30 allows sufficient room for the driver 32 to operate. The flywheel 4 is mounted at the rear of the engine rather than the front, further distributing weight towards the rear. By eliminating the need for push trucks, this starter system makes sprint car racing safer and more suitable for televising.

Having thus described the invention, what is claimed as new and desired to be secured by Letters Patent is:

1. A starter system, in combination with a wheeled racing vehicle powered by internal combustion, comprising:

a vehicle including a chassis, an engine compartment located in a forward portion of said chassis, an engine located in said engine compartment and attached to said chassis, a cockpit compartment located rearward of said engine compartment, a planar, vertically oriented motor mount plate attached to said chassis between said engine compartment and said cockpit and dividing said engine compartment from said cockpit, said mount plate having a forward surface facing said engine compartment and rearward surface facing said cockpit, a starter attached to said rearward surface of said mount plate, said starter including a pinion driven by an electric motor, said pinion projecting through an opening in said mount plate toward said engine compartment, a power source connected to said starter for providing electrical power to said motor, a flywheel mounted on a engine powered shaft, said flywheel positioned rearward of said engine and in close proximity to and parallel alignment with said mount plate, the outer circumferential surface of said flywheel engaged with said pinion, a drive shaft in communication with said flywheel and extending rearward, connecting with the rear wheels of said vehicle, and means for engaging the starter by initiating supply of electrical power from said power source to said electric motor, whereby, upon engagement of said starter, said pinion is rotated, said pinion thereby causing said flywheel to rotate, said flywheel thereby causing said drive shaft to rotate thereby causing motion in associated engine components to initiate internal combustion.

2. The starter system of claim 1 further comprising a starter mounting block for providing a means of attaching said starter to said mount plate in a manner that allows adjustment of the proximity of said pinion to said flywheel.

3. The starter system of claim 1 further comprising a starter mounting block including means for mounting said starter mounting block upon said rearward surface of said mount plate, means for mounting said starter upon said starter mounting block, large central hole for receiving said pinion, and means for pivoting said starter mounting block relative to said mount plate to thereby adjust the position of said pinion relative to said flywheel.

4. The starter system of claim 1 wherein said mount plate partially defines a flywheel compartment.

5. The starter system of claim 1 further comprising a flywheel compartment disposed forward of said mount plate.

6. The starter system of claim 1 wherein said mount plate comprises a starter mount plate.

7. The starter system of claim 6 further comprising spacers attached to said forward surface.

8. The starter system of claim 7 further comprising a rear motor mount plate located forward of said starter mount plate.

9. The starter system of claim 8 wherein said spacers are located between said rear motor mount plate and said starter mount plate.

10. The starter system of claim 8 wherein said rear motor mount plate and starter mount plate comprise a flywheel compartment.

11. The starter system of claim 7 wherein said spacers are attached to a vehicle engine block.

12. The starter system of claim 1 wherein said mount plate comprises a rear motor mount plate.

13. The starter system of claim 12 further comprising spacers attached to said forward surface.

14. A starter system for a vehicle, comprising:

a planar, vertically oriented mount plate attached to a vehicle chassis and disposed between an engine compartment and a cockpit, said mount plate having a forward surface facing said engine compartment and a rearward surface facing said cockpit, a flywheel mounted on an engine powered shaft, said flywheel positioned rearward of said engine and in proximity to said mount plate, and a starter attached to said rearward surface of said mount plate, said starter including a pinion driven by an electric motor, said pinion projecting forward to engage said flywheel.

15. The starter system of claim 14 wherein said mount plate partially defines a flywheel compartment.

16. The starter system of claim 14 wherein said pinion projects in a forward direction through an opening in said mount plate.

17. The starter system of claim 14 further comprising spacers attached to said forward surface.

* * * * *